United States Patent
Jung

(10) Patent No.: US 10,530,846 B2
(45) Date of Patent: Jan. 7, 2020

(54) SCHEDULING PACKETS TO DESTINATION VIRTUAL MACHINES BASED ON IDENTIFIED DEEP FLOW

(71) Applicant: GUBERNET INC., Daejeon (KR)

(72) Inventor: Kiung Jung, Daejeon (KR)

(73) Assignee: GUBERNET INC., Yuseong-Gu, Daejeon (KR)

( * ) Notice: Subject to any disclaimer, the term of this patent is extended or adjusted under 35 U.S.C. 154(b) by 22 days.

(21) Appl. No.: 14/760,374

(22) PCT Filed: Jun. 12, 2015

(86) PCT No.: PCT/KR2015/005914
§ 371 (c)(1),
(2) Date: Jul. 10, 2015

(87) PCT Pub. No.: WO2015/199366
PCT Pub. Date: Dec. 30, 2015

(65) Prior Publication Data
US 2016/0283283 A1    Sep. 29, 2016

(30) Foreign Application Priority Data

| Jun. 26, 2014 | (KR) | 10-2014-0079129 |
| Aug. 12, 2014 | (KR) | 10-2014-0104319 |
| Aug. 27, 2014 | (KR) | 10-2014-0112071 |
| Apr. 2, 2015 | (KR) | 10-2015-0046740 |

(51) Int. Cl.
*H04L 29/08* (2006.01)

(52) U.S. Cl.
CPC ................. *H04L 67/1004* (2013.01)

(58) Field of Classification Search
CPC .... G06F 9/4558; H04L 67/1004; H04L 12/46; H04L 69/22
See application file for complete search history.

(56) References Cited

U.S. PATENT DOCUMENTS

| 6,091,708 A | 7/2000 | Matsunuma |
| 2006/0010207 A1 | 1/2006 | Akerman et al. |
| 2008/0059555 A1 | 3/2008 | Archer et al. |
| (Continued) | | |

FOREIGN PATENT DOCUMENTS

| EP | 2 618 257 A2 | 7/2013 |
| JP | 08-152903 A | 11/1996 |
| (Continued) | | |

OTHER PUBLICATIONS

Notice of Allowance issued by the Korean Patent Office dated Feb. 6, 2017 in corresponding Korean Patent Application No. 10-2014-0079129 (2 pages).

(Continued)

*Primary Examiner* — Benjamin C Wu
(74) *Attorney, Agent, or Firm* — Buchanan Ingersoll & Rooney PC

(57) ABSTRACT

A network interface unit for processing a packet and a method thereof are provided. The network interface unit includes a plurality of queues, if a packet is received through a physical network, identifies a flow of the packet, stores the packet in a plurality of queues in the unit of flow, and processes the packet in parallel through a multiprocessor.

9 Claims, 17 Drawing Sheets

(56) References Cited

U.S. PATENT DOCUMENTS

| | | | |
|---|---|---|---|
| 2009/0316711 A1* | 12/2009 | Memon | H04L 47/10 370/412 |
| 2011/0106518 A1 | 5/2011 | Shin | |
| 2011/0299537 A1* | 12/2011 | Saraiya | H04L 61/2596 370/392 |
| 2011/0321042 A1 | 12/2011 | Yang et al. | |
| 2012/0063458 A1 | 3/2012 | Klink et al. | |
| 2012/0072908 A1 | 3/2012 | Schroth et al. | |
| 2014/0059111 A1* | 2/2014 | Veeraiyan | H04L 67/02 709/201 |
| 2014/0201845 A1* | 7/2014 | Anantharam | H04L 63/0428 726/26 |

FOREIGN PATENT DOCUMENTS

| | | |
|---|---|---|
| JP | 20130531299 A | 8/2013 |
| JP | 20130543611 A | 12/2013 |
| KR | 100329911 B1 | 3/2002 |
| KR | 1020040005824 A | 1/2004 |
| KR | 1020110048828 A | 5/2011 |
| KR | 20110114909 A | 10/2011 |

OTHER PUBLICATIONS

Communication pursuant to Rule 164(1) EPC and partial supplementary European Search Report dated Feb. 5, 2018, by the European Patent Office in corresponding European Patent Application No. 15811135.1. (16 pages).

Korean Office Action issued by the Korean Patent Office dated Nov. 17, 2014 in corresponding Korean Patent Application No. 10-2014-0079129 (5 pages).

Korean Office Action issued by the Korean Patent Office dated Feb. 25, 2015, in corresponding Korean Patent Application No. 10-2014-0112071 (4 pages).

Korea Office Action issued by the Korean Patent Office dated Jun. 26, 2015 in corresponding Korean Application No. 10-2014-0112071 (4 pages).

\* cited by examiner

SCHEDULING PACKETS TO DESTINATION VIRTUAL MACHINES BASED ON IDENTIFIED DEEP FLOW

TECHNICAL FIELD

The present invention relates to a multi-scheduling method and apparatus, and more particularly, to a scheduling method and apparatus in a multiprocessing environment for processing a packet in parallel.

BACKGROUND ART

A multiprocessing system processes a plurality of processes in parallel by using a plurality of central processing unit (CPU) cores. However, multiprocessing causes problems of uniform loading balancing between the CPU cores, a collision between resources shared by the CPU cores, a cache efficiency deterioration, etc.

In particular, in order to improve packet processing efficiency, the multiprocessing system that processes a packet in parallel may enable the same CPU to process packets belonging to the same flow and may keep a flow affinity with a CPU. In this case, a particular CPU may be overloaded, and thus load balancing between all CPUs may be imbalanced. Therefore, whole processing efficiency of the multiprocessing system may be lowered.

In order to solve this, load balancing may be periodically performed between CPUs. In this case, a CPU that processes a flow is changed in a load balancing process and thus makes a flow affinity is lowered, and a packet processing order is changed to make a packet re-ordering process required. Therefore, packet processing efficiency of the multiprocessing system is lowered.

As described above, a flow affinity and appropriate load balancing are required to improve processing efficiency of the multiprocessing system. However, the two are conflict with each other, and thus this may be appropriately complemented.

Also, internet traffic has been recently increased, and thus a server has had a large capacity and a high speed. A virtualization of the server has accelerated to a solution to a physical volume increase, cost, etc. caused by the large capacity of the server. Due to the large capacity, the high-speed, and the virtualization of the server, high efficiency of parallel processing for massive data including a data packet, which is generated a virtualization environment received from a physical network, is required. Also, when a virtual switch function is performed in a virtualization server, a performance of the server is deteriorated due to a load increase in the server. As a result, there is required a realization of a technology that changes a load of the server depending on the virtual switch function into a physical network interface unit.

A conventional network interface card (NIC) that supports a virtualization environment has tried to generate and manage a queue in the unit of virtual machine, as a method of supporting a virtualization environment in a physical network interface device, so as to reduce a bottleneck phenomenon between a network interface device and a virtual switch of a server. However, the try is made only in the unit of virtual machine when performing processor allocation and redistribution of queues for parallel processing for a received data packet. In other words, processor allocation considering only physical layers of a virtualization environment is performed. Therefore, a processor affinity that is one of elements very important to improve processing efficiency in parallel processing may not be considered, and processor allocation and redistribution of queues occur in consideration of only use load of a processor. This may operate as a factor of reducing efficiency of parallel processing.

DETAILED DESCRIPTION OF THE INVENTION

Technical Problem

Provided are scheduling method and apparatus for alleviating a conflict between a flow affinity and load balancing in a multiprocessing environment performing packet parallel processing and improving use efficiencies of all processors.

Technical Solution

According to an aspect of an exemplary embodiment, there is provided a scheduling method in a multiprocessing apparatus, the scheduling method including: grouping all or some of a plurality of processors into at least one or more processor groups; if there exists a processor group or a processor designated for a flow of a received packet, allocating the flow to the designated processor group or processor; and if there does not exist the processor group or the processor designated for the flow of the received packet, generating a new processor group for the flow and allocating the flow to the new processor group or allocating the flow to a processor that does not belong to any processor group.

According to an aspect of another exemplary embodiment, there is provided a scheduling method in a multiprocessing apparatus, the scheduling method including: determining single scheduling or multi-scheduling based on load states or processing capacities of a plurality of processors or an attribute of a received packet; if the single scheduling is determined, designating one of the plurality of processors as a scheduler; and if the multi-scheduling is determined, grouping the plurality of processors into at least two or more processor groups and designating one of processors in each of the processor groups as a scheduler of each of the processor groups.

According to an aspect of another exemplary embodiment, there is provided a scheduling method including: acquiring a deep packet including virtualization environment network layer information encapsulated in a physical network frame, from a packet received through a physical network; identifying a deep flow of the deep packet based on the virtualization environment network layer information included in the deep packet; and allocating the deep packet to a corresponding queue in the unit of the identified deep flow.

According to an aspect of another exemplary embodiment, there is provided a network interface unit including: a packet receiver configured to acquire a deep packet including virtualization environment network layer information encapsulated in a physical network frame, from a packet received through a physical network; a packet analyzer configured to identify a deep flow of the deep based on the virtualization environment network layer information included in the deep packet; and a scheduler configured to allocate the deep packet to a corresponding queue in the unit of the identified deep flow.

Advantageous Effects of the Invention

According to the present invention, a conflict between a flow affinity and load balancing may be alleviated to improve a performance of parallel processing. Also, a plurality of schedulers that are dynamically designated may be used to reduce a latency caused by packet scheduling and queueing. Also, various types of scheduling algorithms depending on traffic attributes may be easily applied through the plurality of schedulers. In addition, a load of a server including a virtualization environment including a plurality of virtual machines is reduced. A packet is processed in the unit of deep flow to increase an affinity between a deep packet and a processor so as to improve efficiency of parallel processing. Also, a load of a virtual switch may be distributed into a network interface card to improve efficiency of virtual network processing. In addition, a packet may be queued and processed in the unit of deep flow to realize scalable communication processing securing QoS of a deep flow unit between virtual machine terminals.

MODE OF THE INVENTION

A multi-scheduling method and apparatus in a multiprocessing environment according to the present invention will now be described in detail with reference to the attached drawings.

Figure 1:
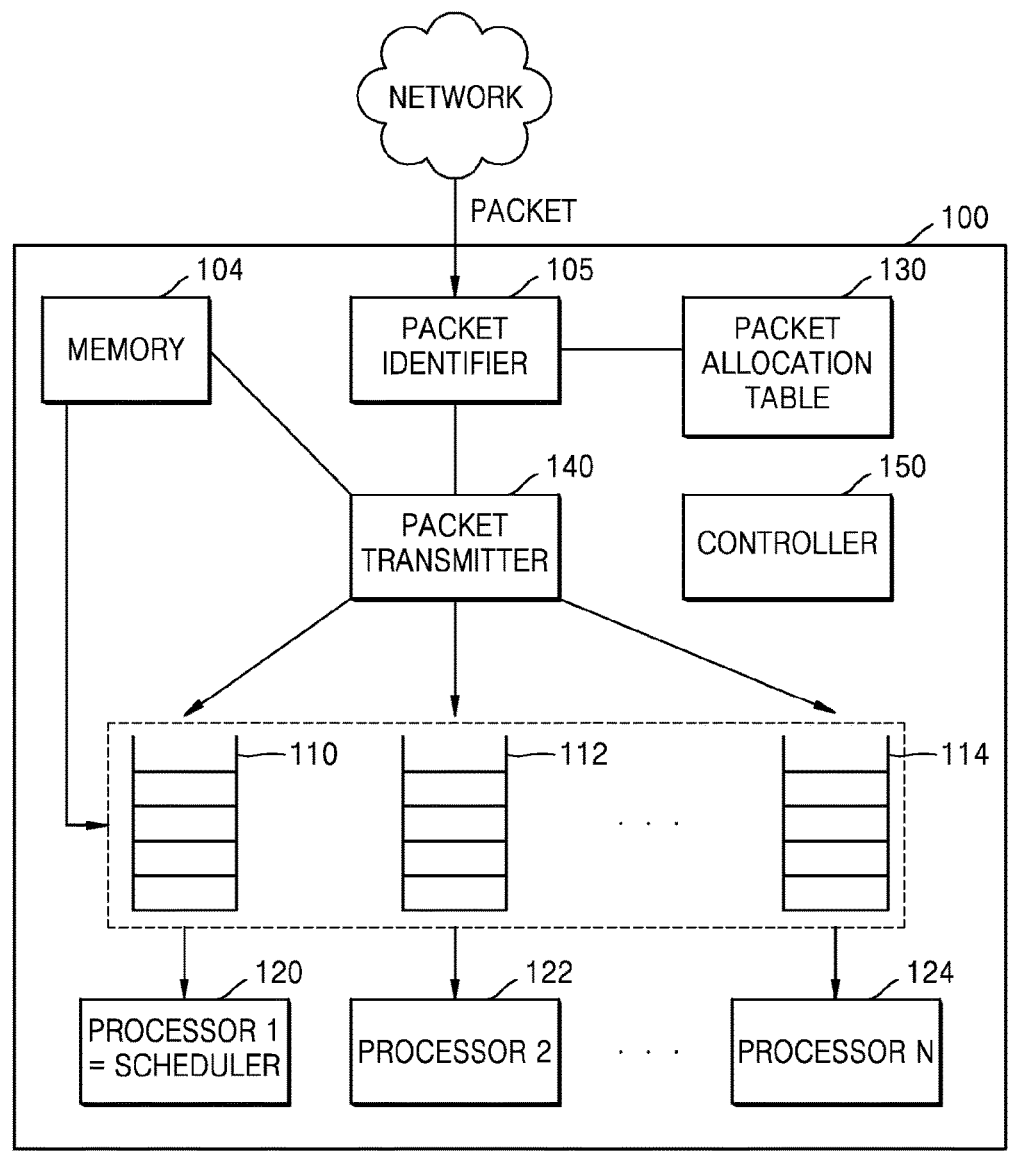
FIG. 1 is a view illustrating a multiprocessing apparatus for performing single scheduling, according to an exemplary embodiment of the present invention.

FIG. 1 is a view illustrating a multiprocessing apparatus for performing single scheduling according to an exemplary embodiment of the present invention.

Referring to FIG. 1, a multiprocessing apparatus 100 includes a packet identifier 105, a packet transmitter 140, a packet allocation table 130, a memory 104, a plurality of queues 110, 112, and 114, a plurality of processors 120, 122, and 124, and a controller 150.

The packet identifier 105 receives a packet from a wired or wireless network or another apparatus and identifies a flow of the received packet. The packet identifier 105 also checks whether there is a processor allocated to the flow of the received packet, with reference to the packet allocation table 130.

The packet allocation table 130 includes information of processors respectively allocated to flows of the packet. For example, the packet allocation table 130 includes information indicating that a first processor is allocated as a processor for processing first and second flows, and a second processor is allocated as a processor for processing a third flow. The information stored in the packet allocation table 130 is generated and updated by a scheduler that will be described later.

The memory 104 stores the packet received by the packet identifier 105. Here, the memory 104 may store flow information of the packet recognized by the identifier 105, processor information recognized with reference to the packet allocation table 130, etc. together.

The packet transmitter 140 transmits packets stored in the memory 104 to a queue of a corresponding processor. The packet transmitter 140 may sequentially transmit the packets stored in the memory to processor queues or may non-sequentially transmit the packets to the queues of the processors in consideration of various conditions such as Quality of Service (QoS), priority, etc.

The queues 110, 112, and 114 receive a packet, which will be processed by each processor, from the memory 104 and store the packet. In the present exemplary embodiment, the queues 110, 112, and 114 respectively exist in the processors 120, 122, and 124 one by one but are not necessarily limited thereto. Two or more queues may exist in one processor or two or more processors may share one queue. Alternatively, the queues 110, 112, and 114 may be grouped through a method disclosed FIGS. 11 through 17.

Also, the queues 110, 112, and 114 have First-In-First-Out (FIFO) structures but are not necessarily limited thereto. Therefore, the queues 110, 112, and 114 may be realized in various types of structures such as Last-In-First-Out (LIFO) structures, priority-based outputs, etc., i.e., may have any structures capable of storing a packet that will be processed by each processor.

If packet flow information does not exist in the packet allocation table 130, the controller 150 designates one of a plurality of processors as a scheduler and then transmits an interrupt request signal. The processor that receives the interrupt request signal selects a processor that will process a packet and stores associated information in the packet allocation table.

The plurality of processors 120, 122, and 124 respectively process packets. An additional scheduler for packet scheduling may not be included in consideration of efficiency and a reduction in manufacturing cost of a multiprocessing system, and one (e.g., the first processor 120) of a plurality of processors may be used as a scheduler. A method of using one of a plurality of processors as a scheduler will be described with reference to FIG. 2. Also, an additional scheduler may be included besides the plurality of processors in the present exemplary embodiment.

Figure 2:
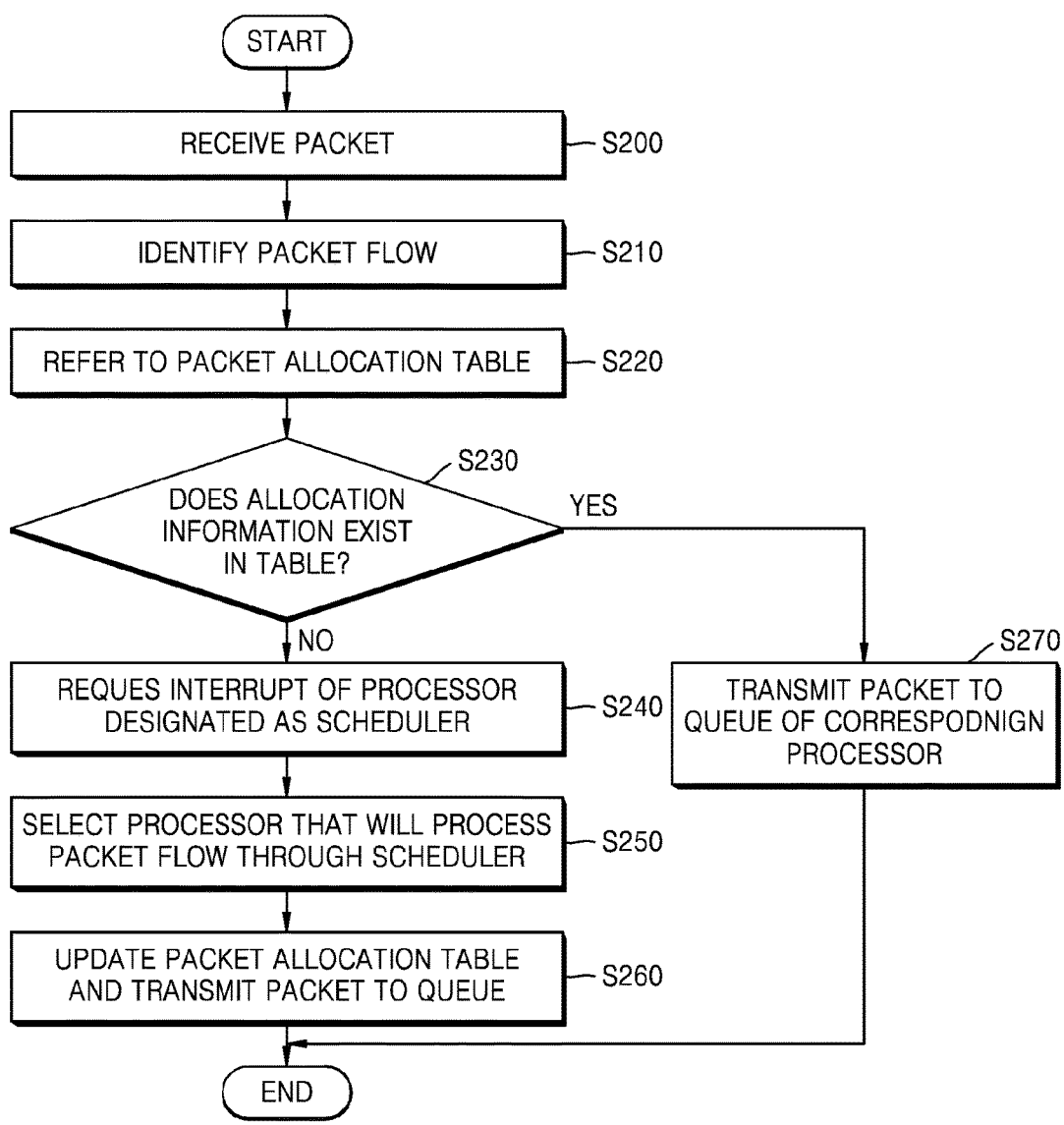
FIG. 2 is a view illustrating a multiprocessing method for performing single scheduling according to an exemplary embodiment of the present invention.

FIG. 2 is a view illustrating a multiprocessing method for performing single scheduling according to an exemplary embodiment of the present invention.

Referring to FIGS. 1 and 2, in operation S200 and S210, the packet identifier 105 analyzes a received packet to identify a packet flow. Here, a flow identifying method analyzes traffic attributes of all network layers of a received packet to classify the packet flow according to a preset network communication policy. For example, one flow may be identified according to a preset communication policy by using attributes such as a transmission node address, a destination address, a session and an application layer, etc. of the received packet as elements. In operation S220, the packet identifier 105 checks whether there exists information of a processor that will process a flow, with reference to the packet allocation table 130. A packet, flow information of the corresponding packet, processor information, etc. are stored in the memory 104.

If the information of the processor that will process the flow exists in the packet allocation table 130 in operation S230, the packet transmitter 140 transmits the packet to a queue of the corresponding processor in operation S260. For example, if the received packet is identified as a first flow by the packet identifier 105, and a second processor is allocated in the packet allocation table 130 as a processor that will process the first flow, the packet transmitter 140 transmits the packet to the queue 112 of the second processor 122.

If the information of the processor that will process the flow does not exist in the packet allocation table 130, i.e., the flow is a new flow, in operation S230, the controller 150 transmits an interrupt request signal to one of a plurality of processors designated as a scheduler in operation S240. The controller 150 may designate one of the plurality of processors currently having less load as a scheduler, designate a scheduler through a preset scheduler determination algorithm, or designate a preset processor as a scheduler. In the present exemplary embodiment, the first processor 120 is designated as a scheduler.

In operation S250, the processor 120 that receives the interrupt request signal stops a previously performed job and performs a scheduling operation. For example, the processor 120 designated as the scheduler selects a processor, which will process a new flow, in operation S250 and stores information about the selected processor in the packet allocation table 130 in operation S260. If an interrupt request is transmitted to a processor designated as a scheduler, an interrupt request for processing a newly input packet is disapproved until the interrupt is relieved.

Also, the processor 120 designated as the scheduler may apply existing various load balancing algorithms to try load re-balancing between processors, periodically or when a particular event occurs, i.e., load unbalancing of processors is higher than or equal to a preset level.

As shown in FIGS. 1 and 2, when one scheduler 120 is selected to perform a corresponding job, a new interrupt is disapproved from a system, and processing of a new flow is delayed until a requested interrupt is released. Also, load re-balancing for settling load unbalancing is performed with respect to all of a plurality of processors. Therefore, a conflict between a flow affinity and load balancing becomes more serious. This may be relieved through multi-scheduling of FIG. 4.

Figure 3:
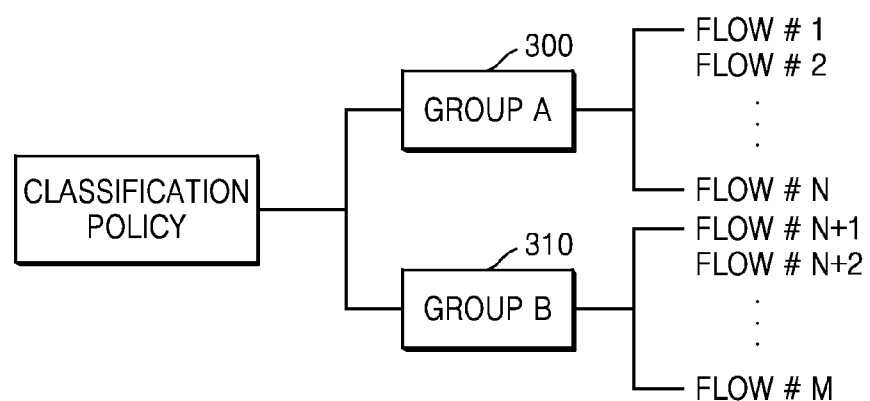
FIG. 3 is a view illustrating a classification policy for multi-scheduling according to an exemplary embodiment of the present invention.

FIG. 3 is a view illustrating a classification policy for multi-scheduling according to an exemplary embodiment of the present invention.

Referring to FIG. 3, the classification policy includes a policy for dividing a plurality of processors into groups. As will be described with reference to FIG. 4, multi-scheduling divides a plurality of processors into at least two or more groups and performs scheduling with respect to each of the groups. For this, a policy for dividing the plurality of processors into groups is required.

As an example of the classification policy, there is a packet flow-based policy as shown in FIG. 3. A flow may be divided into two groups A and B based on an attribute that may hierarchically divide a packet flow. In this case, the plurality of processors may be divided into two groups according to which group a flow to be currently processed belongs to.

As another example, there is a classification policy based on loads of processors. Processors may be divided according to the preset number of groups to uniformalize a load distribution of each group.

There may be a plurality of classification policies for dividing a plurality of processors into groups. For example, a first policy may be policy for dividing a plurality of processors into two groups based on a flow, a second policy may be a policy for dividing a plurality of processors into three groups based on a flow, and a third policy may be a policy for dividing a plurality of processors into at least two or more groups according to load of the plurality of processors.

Figure 4:
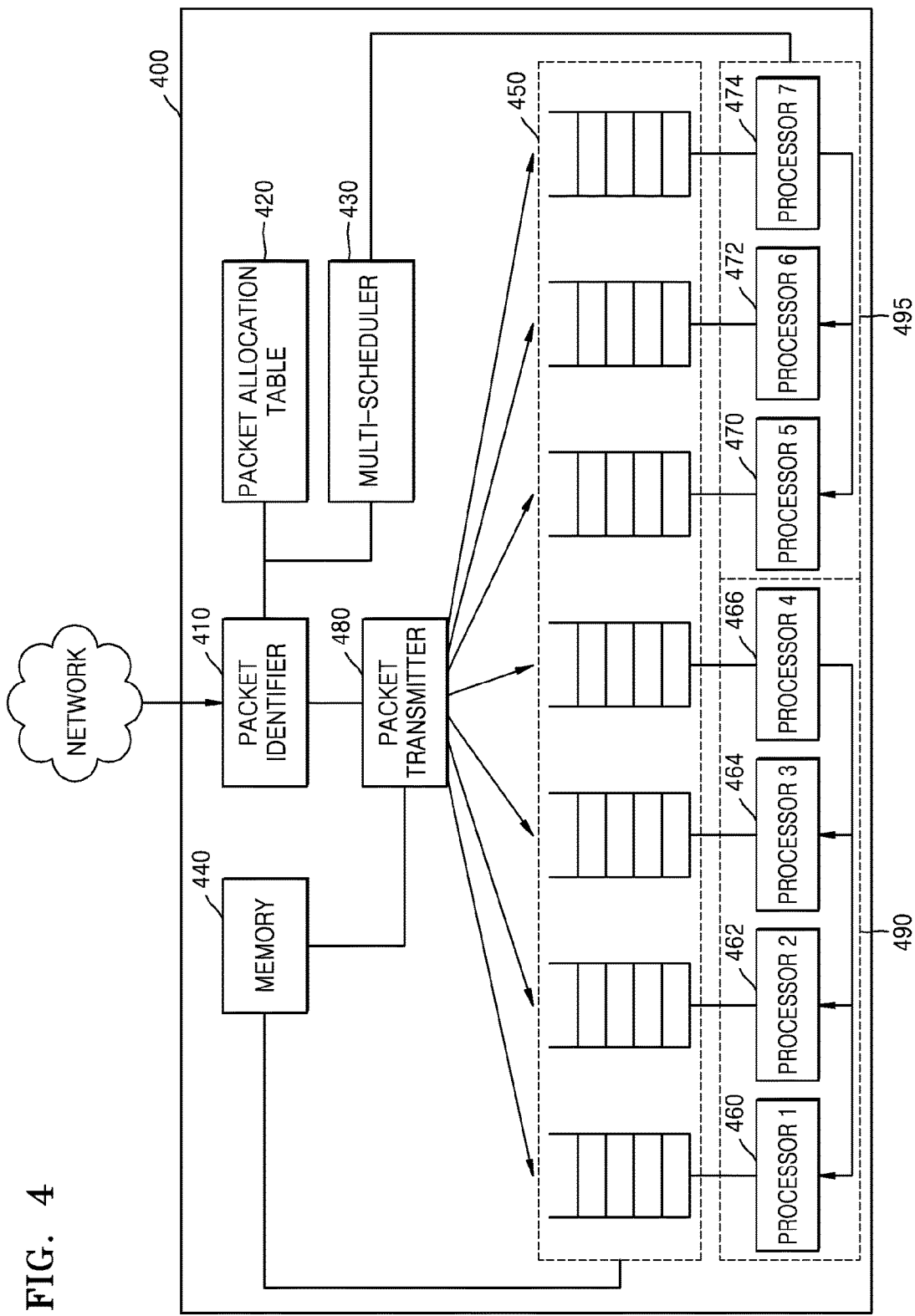
FIG. 4 is a view illustrating a structure of a multiprocessing apparatus using a multi-scheduling method according to an exemplary of the present invention.

The present invention is not limited to the exemplary embodiment of FIG. 3 and may apply various types of classification policies for dividing processors. A classification policy may be preset and updated through an additional input/output interface by a user. As shown in FIG. 4, a criterion, i.e. a classification policy, for dividing a plurality of processors may be preset for multi-scheduling.

FIG. 4 is a view illustrating a structure of a multiprocessing apparatus using a multi-scheduling method according to an exemplary embodiment of the present invention.

Referring to FIG. 4, a multiprocessing apparatus 400 includes a packet identifier 410, a packet transmitter 480, a packet allocation table 420, a multi-scheduler 430, a memory 440, a plurality of queues 450, and a plurality of processors 460, 462, 464, 466, 470, 472, and 474.

The packet identifier 410, the packet transmitter 480, the packet allocation table 420, the memory 440, the plurality of queues 450, the processors 460, 4620, 464, 466, 470, 472, and 474, etc. include all structures and functions described with reference to FIG. 1. Therefore, repeated descriptions of the same elements and functions of the present exemplary embodiment as the elements and functions of FIG. 1 are omitted, and elements and functions necessary for multi-scheduling according to the present exemplary embodiment will be mainly described.

The multi-scheduler 430 determines whether single scheduling or multi-scheduling is performed, based on state information of a multiprocessing system such as a load distribution state, a traffic attribute, a traffic processing capacity, etc. For example, the multi-scheduler 430 may perform the single scheduling and then change the single scheduling into multi-scheduling. On the contrary, the multi-scheduler 430 may perform the multi-scheduling and then change the multi-scheduling into the single scheduling.

Figure 5:
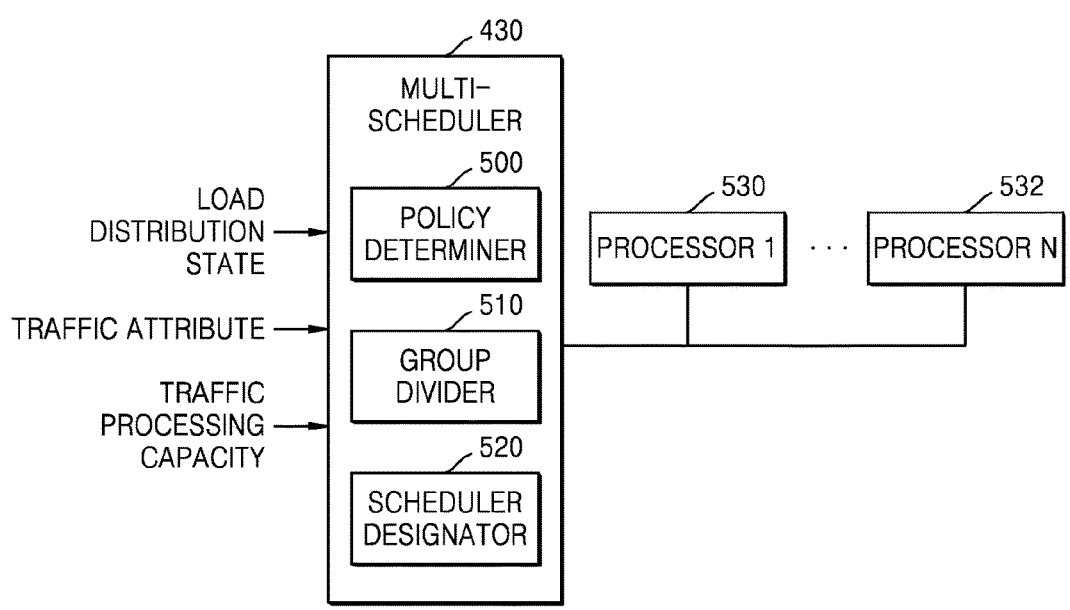
FIG. 5 is a view illustrating a detailed structure of a multi-scheduler according to an exemplary embodiment of the present invention.

If there are a plurality of classification policies as shown in FIG. 3, the multi-scheduler 430 may determine which classification policy will be applied, based on state information. If the multi-scheduler 430 determines that the multi-scheduling will be performed, the multi-scheduler 430 classifies a plurality of processors into at least two or more groups according to a classification policy and designates a scheduler that will perform scheduling with respect to each of the groups. A detailed structure of the multi-scheduler is illustrated in FIG. 5.

For example, as shown in FIG. 4, the multi-scheduler 430 divides 7 processors into two processor groups (first group: first through fourth processors, second group: fifth through seventh processors) and designates processors 466 and 474 respectively belonging to the two groups as schedulers according to a preset scheduler determination algorithm. If the multi-scheduler 430 divides processors into groups, information about processor groups may be stored in the packet allocation table 420.

For example, if processors are grouped based on a flow as shown in FIG. 3, the multi-scheduler 430 stores information about which group a flow belongs to, in the packet allocation table 420.

If information about a newly received packet flow does not exist in the packet allocation table 420, the packet identifier 410 checks which group the new flow belongs to and stores the corresponding packet and identification information about the corresponding packet in the memory 440. The multi-scheduler 430 designates a scheduler that will process a corresponding packet in a corresponding group through a load degree or a preset scheduler determination algorithm and transmits an interrupt request signal to the designated scheduler so as to process the corresponding packet. The processor designated as the scheduler performs a scheduling operation of selecting a processor in a group that will process a corresponding flow, or the like as shown in FIG. 1.

For example, according to a grouping policy of FIG. 3, a first processor group 490 including first through fourth processors may be allocated into flow group A 300, and a second group 495 including fifth through seventh processors may be allocated into flow group B 310. If a flow of a received packet belongs to the flow group A 300, the multi-scheduler 430 designates one of processors belonging to the first processor group 490 as a scheduler so as to perform a scheduling operation in the corresponding group 490. Here, the second processor group 495 may perform processing of a new packet or a scheduling operation regardless of whether the scheduling operation of the first group 490 is performed, so as to improve processing efficiencies of all processors. In other words, the scheduling operations of the first processor group 490 and the second processor group 495 may be performed in parallel.

As another example, in multi-scheduling, grouping of processors may be frequently changed according to a load of a processor, several policies, etc., and processors that are not grouped may be newly grouped into processor groups for a new flow of a received packet. This will be described later with reference to FIGS. 9 and 10.

FIG. 5 is a view illustrating a detailed structure of a multi-scheduler according to an exemplary embodiment of the present invention.

Referring to FIG. 5, the multi-scheduler 430 includes a policy determiner 500, a group divider 510, and a scheduler designator 520.

The policy determiner 500 determines single scheduling or multi-scheduling by using state information of a multi-processing environment, e.g., information such as a load distribution state, a traffic attribute, a traffic processing capacity, etc. Also, if the policy determiner 500 performs the multi-scheduling, the policy determiner 500 determines how to divide a plurality of processors or which policy will be applied to each of the divided groups.

For example, if a whole traffic processing capacity of a multiprocessing apparatus is lower than or equal to a preset level, the policy determiner 500 may determine to perform the multi-scheduling and select a policy based on a flow as shown in FIG. 3 as a classification policy.

The group divider 510 divides the plurality of processors into at least two or more groups according to the classification policy determined by the policy determiner 500.

The scheduler designator 520 designates one of processors in each group as a scheduler through a load degree or a preset scheduler selection algorithm. For example, the scheduler designator 520 may designate a processor having a smallest load in each group as a scheduler. Besides this, a particular processor may be fixed to a scheduler or other several selection methods may be applied to dynamically designate a scheduler.

Figure 6:
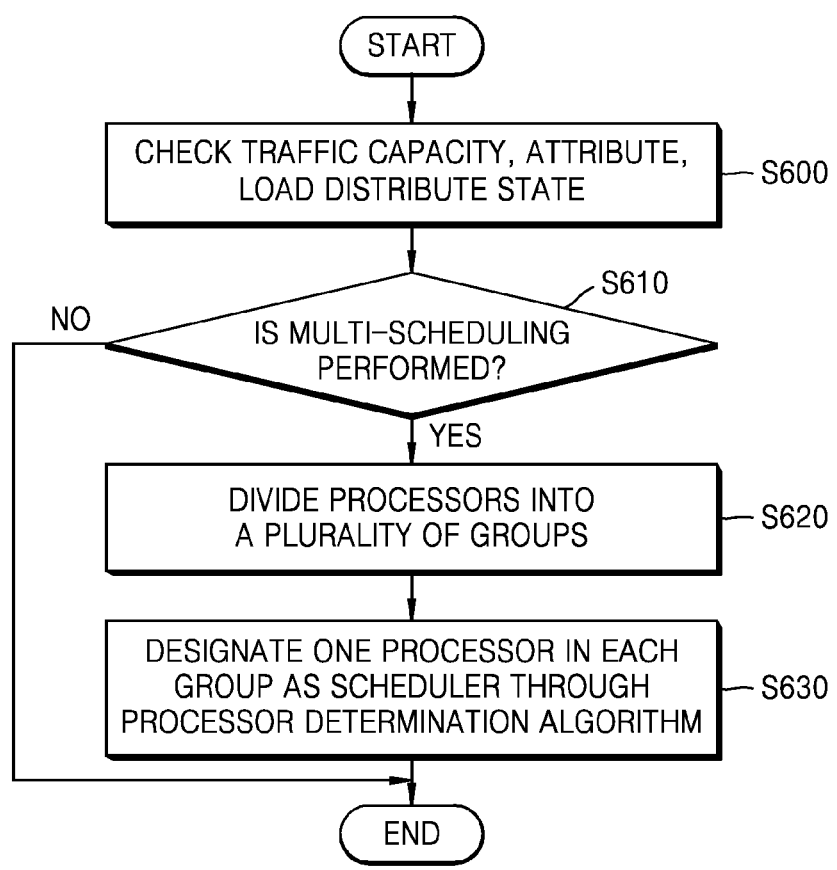
FIG. 6 is flowchart of a multi-scheduling method in a multiprocessing environment according to an exemplary embodiment of the present invention.

FIG. 6 is a flowchart of a multi-scheduling method in a multiprocessing environment according to an exemplary embodiment of the present invention.

Referring to FIGS. 4 and 6 together, in operation S600, the multi-scheduler 430 checks state information such as a traffic capacity, a flow attribute, a load distribution state, etc. In operation S610, the multi-scheduler 430 determines whether perform single scheduling or multi-scheduling will be performed, based on the state information. If the multi-scheduler 430 performs the single scheduling, the multi-scheduler 430 designates one of a plurality of processors as a scheduler. If the multi-scheduler 430 performs the multi-scheduling, the multi-scheduler 430 divides the plurality of processors into at least two or more groups according to a classification policy in operation S620 and designates a processor that will operate as a scheduler in each group in operation S630. As shown in FIG. 1, a processor designated in each group performs a scheduling operation with respect to a corresponding packet according to an interrupt request signal. However, the processor designated in each group performs scheduling with respect to only processors of a group to which the designated processor belongs, not with respect to all processors. Therefore, schedulers designated in two or more divided groups may independently simultaneously perform scheduling jobs. In other words, a scheduler of each group may receive an interrupt signal from the multi-scheduler 430 and perform a scheduling job such as a selection of a processor for processing a packet, etc. regardless of whether an interrupt for a scheduler of another group is released. Also, the divided groups may respectively independently use different policies or algorithms.

Figure 7:
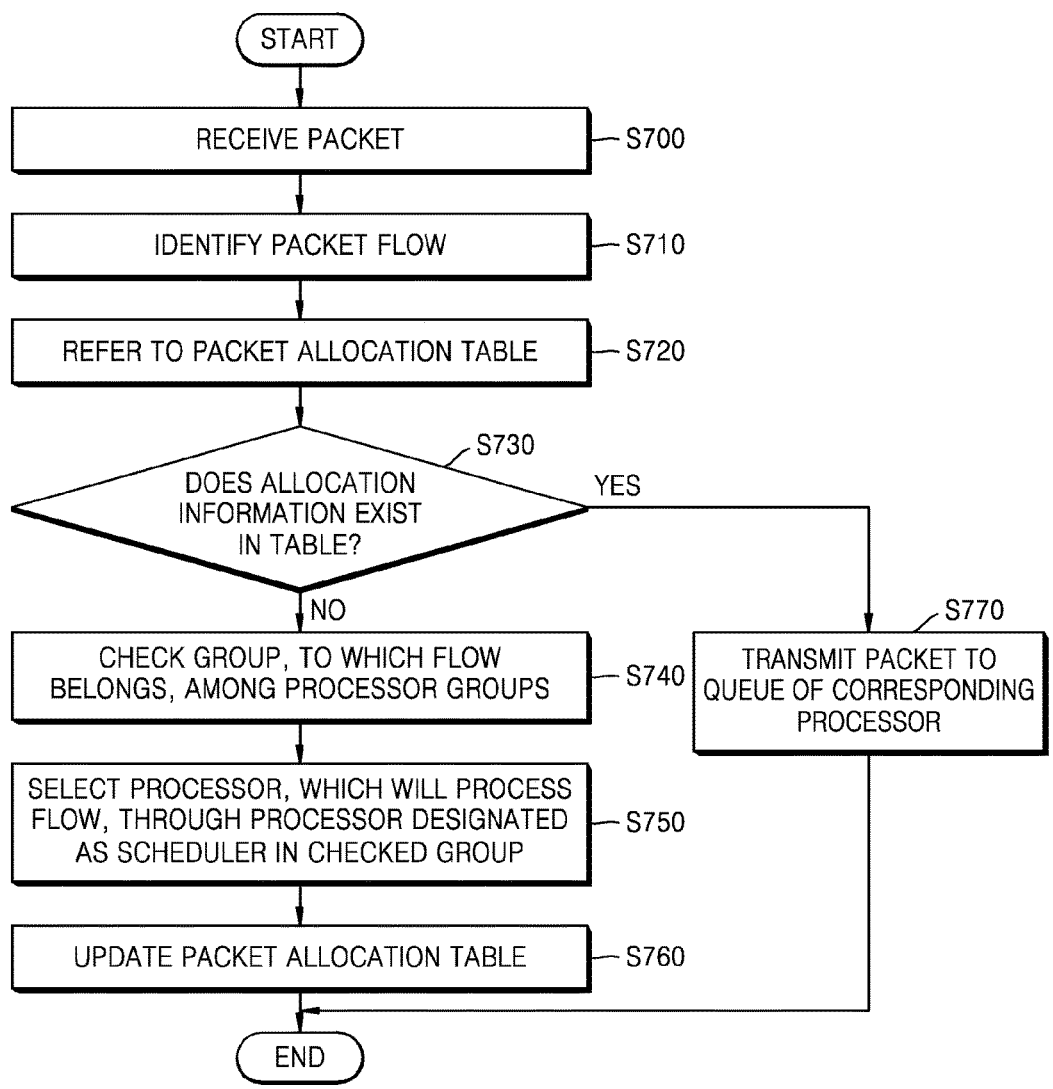
FIG. 7 is a flowchart of a multi-scheduling method in a multiprocessing environment according to another exemplary embodiment of the present invention.

FIG. 7 is a flowchart illustrating a multi-scheduling method in a multiprocessing environment according to another exemplary embodiment of the present invention. In FIG. 7, a plurality of processors may be grouped by a multi-scheduler as described above.

Referring to FIGS. 4 and 7, the packet identifier 410 receives a packet in operation S700 and analyzes the packet to identify a flow in operation S710.

If information about the corresponding flow exists in the packet allocation table 420 in operation S730, the packet identifier 410 checks which group a new flow belongs to and stores the corresponding packet and identification information about the corresponding packet in the memory 440. The multi-scheduler 430 transmits an interrupt request signal to a corresponding scheduler to process the corresponding packet.

If the information about the corresponding flow does not exist in the packet allocation table 420 in operation S730, the multi-scheduler 430 checks a group to which the flow belongs, with reference to a classification policy in operation S740. For example, if processor groups are divided based on a flow as shown in FIG. 3, the multi-scheduler 430 checks which group a newly recognized flow belongs to, based on a high-rank attribute that hierarchically divides a flow. As another example, if processor groups are divided according to a load distribution, the multi-scheduler 430 may select a group having a relatively low load as a group to which a newly recognized flow belongs.

The multi-scheduler 430 checks which group a new flow belongs to, designates a scheduler that will process a corresponding packet in a corresponding group by using a load degree or a preset scheduler determination algorithm, and transmits an interrupt signal to the designated scheduler to process the corresponding packet.

A processor that receives an interrupt signal operates as a scheduler, selects a processor that will process a new flow, and stores associated information in the packet allocation table 420 in operation S750 and 760.

For example, referring to FIG. 4 again, if a new flow is allocated into a group including first through fourth processors, the multi-scheduler 430 transmits an interrupt signal to the fourth processor 466 designated as a scheduler. The fourth processor 466 selects the first processor 460 as a processor that will process a corresponding packet, through a preset processor determination algorithm and stores corresponding information in the packet allocation table 420. If a packet of the same flow is received, the packet transmitter 480 allocates the corresponding packet to the first processor 460.

Figure 8:
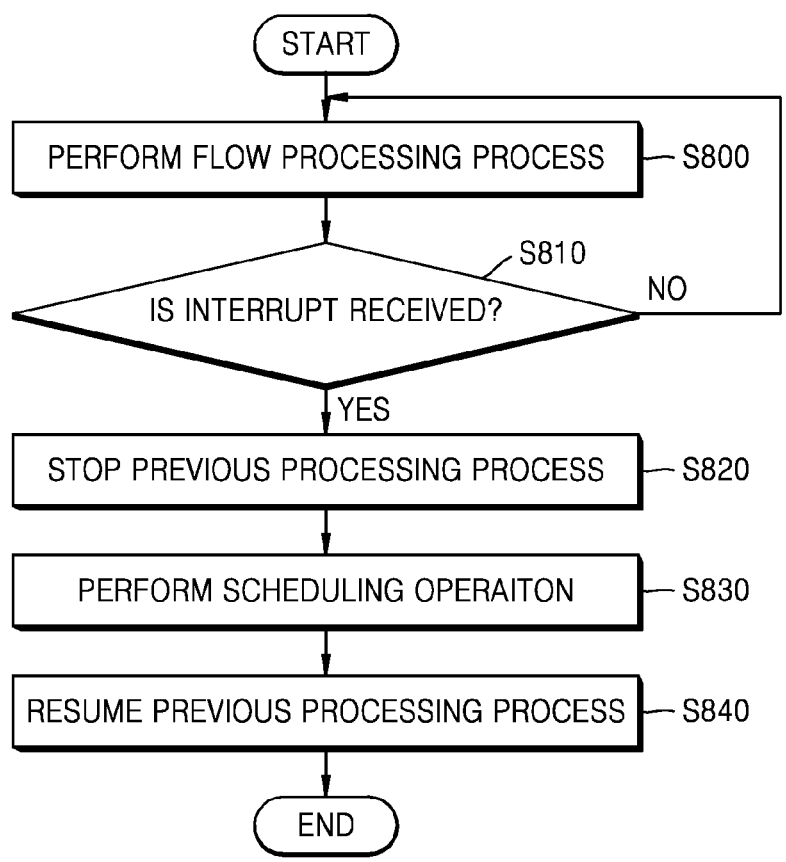
FIG. 8 is a flowchart of a scheduling method of a processor designated as a scheduler in a processor group in a multiprocessing environment, according to an exemplary embodiment of the present invention.

FIG. 8 is a flowchart illustrating a scheduling method of a processor designated as a scheduler in a processor group in a multiprocessing environment according to an exemplary embodiment of the present invention.

Referring to FIG. 8, in operation S800, a plurality of processors perform flow processing processes before receiving an interrupt signal. If there is a processor group or a processor allocated to a flow of a newly received packet, the multi-scheduler 430 allocates a flow to a pre-designated processor group or processor. If there is no processor group or processor allocated to the flow of the newly received packet, the multi-scheduler 430 generates a processor group for the flow of the new packet and transmits an interrupt signal to one processor in the generated processor group in operation S810.

The processor that receives the interrupt signal stops a previously performed operation in operation S820, performs a scheduling operation of determining which processor the flow of the new packet will be allocated in operation S830, and resumes an operation performed before receiving the interrupt signal in operation S840. The multi-scheduler 430 may respectively transmit the interrupt signal to processor groups, and thus the processor groups may respectively simultaneously perform scheduling operations.

Figure 9:
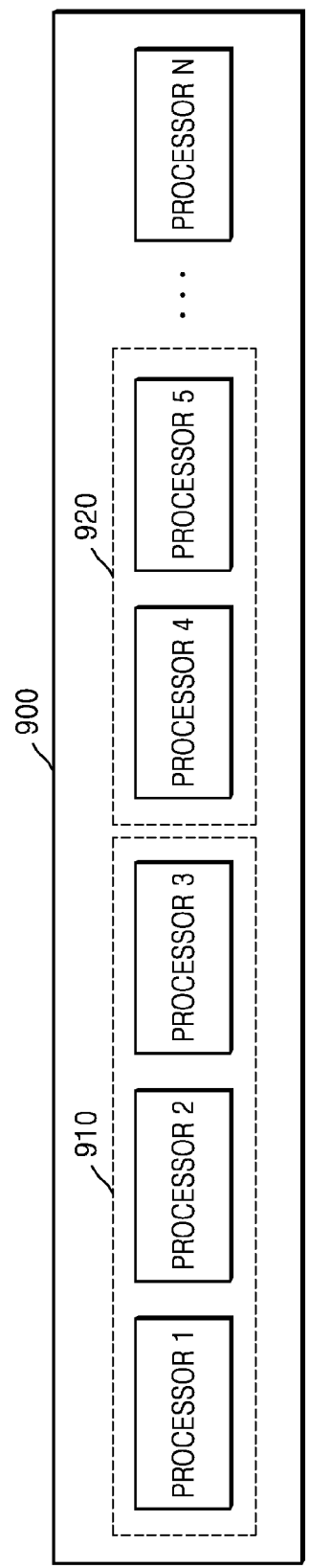
FIG. 9 is a view illustrating processor grouping for multi-scheduling according to an exemplary embodiment of the present invention.

FIG. 9 is a view illustrating processor grouping for multi-scheduling according to an exemplary embodiment of the present invention.

Referring to FIG. 9, if the multi-scheduler 430 performs single scheduling, the multi-scheduler 430 designates one of a plurality of processors 900 as a scheduler. If the multi-scheduler 430 performs multi-scheduling, the multi-scheduler 430 divides all or some of the processors into at least one or more groups 910 and 920 and respectively designates schedulers for the groups.

The multi-scheduler 430 may generate a new processor group or update an existing processor group according to load states or preset several policies of the processors.

For example, in the case of multi-scheduling, the multi-scheduler 430 may divide a plurality of processors into a first group 910 including first through third processors and a second group 920 including fourth and fifth processors and may not group the other processors.

If a new processor group is needed to be generated during a multi-scheduling operation, the multi-scheduler 430 may group all or some of the processors that are not currently grouped to generate a new processor group or may re-group existing processor groups to generate a new processor group.

Figure 10:
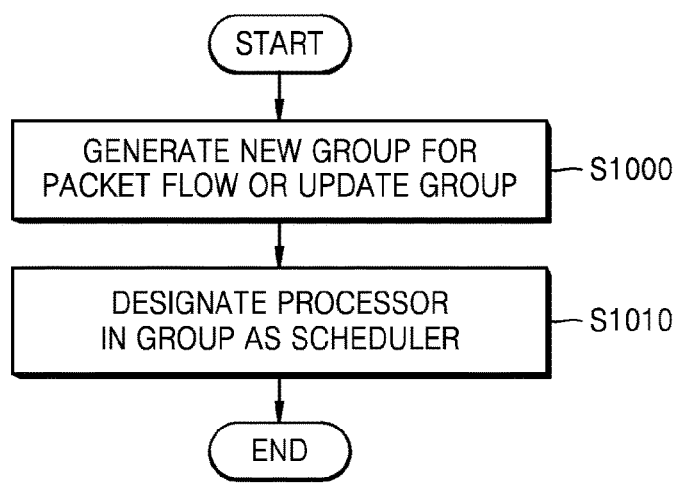
FIG. 10 is a view illustrating a method of dynamically grouping processors for multi-scheduling, according to an exemplary embodiment of the present invention.

As another example, the multi-scheduler 430 may perform an updating operations of adding a new processor to existing groups e.g., the first group 910 including the first through third processors and the second group 920 including the fourth and fifth processors or excluding some of processors from the existing groups, during the multi-scheduling operation, FIG. 10 is a view illustrating a method of dynamically grouping processors for multi-scheduling according to an exemplary embodiment of the present invention.

Referring to FIG. 10, if a new processor group for a flow of a received packet is required or a change of a previous processor group is required, the multi-scheduler 430 newly generates a processor group or updates an existing processor group in operation S1000. For example, if a processor group or a processor allocated to a flow of a newly received packet does not exist, the multi-scheduler 430 generates all or some of processors, which are not grouped, as a new processor group.

As another example, if a load in a processor group or a load of all processors reach a preset level or according to a preset policy, the multi-scheduler 430 may newly make all of processor groups, add a new processor to a particular processor group, and exclude at least one of existing processors from a group.

In operation S1010, the multi-scheduler 430 designates one in a generated or updated processor group as a scheduler. One processor in each group does not operate as a scheduler at all times, operates as a scheduler only when receiving an interrupt signal as described above with reference to FIG. 8, and performs the same operation as other general processors if a scheduling operation is completed.

Until now, a method of mainly grouping and scheduling a plurality of processors has been described. Hereinafter, a method of mainly grouping and scheduling queues connected to a plurality of processors will now be described. Technical elements of FIGS. 1 through 10 may be added to technical elements of FIGS. 11 through 17 or the elements of FIGS. 11 through 17 may be added to the elements of FIGS. 1 through 10. In other words, grouping of a plurality of processors described with FIGS. 1 through 10 and grouping of a plurality of queues that will be described with reference to FIGS. 11 through 17 may be simultaneously performed. A multiprocessing apparatus may be realized as a network interface unit.

Figure 11:
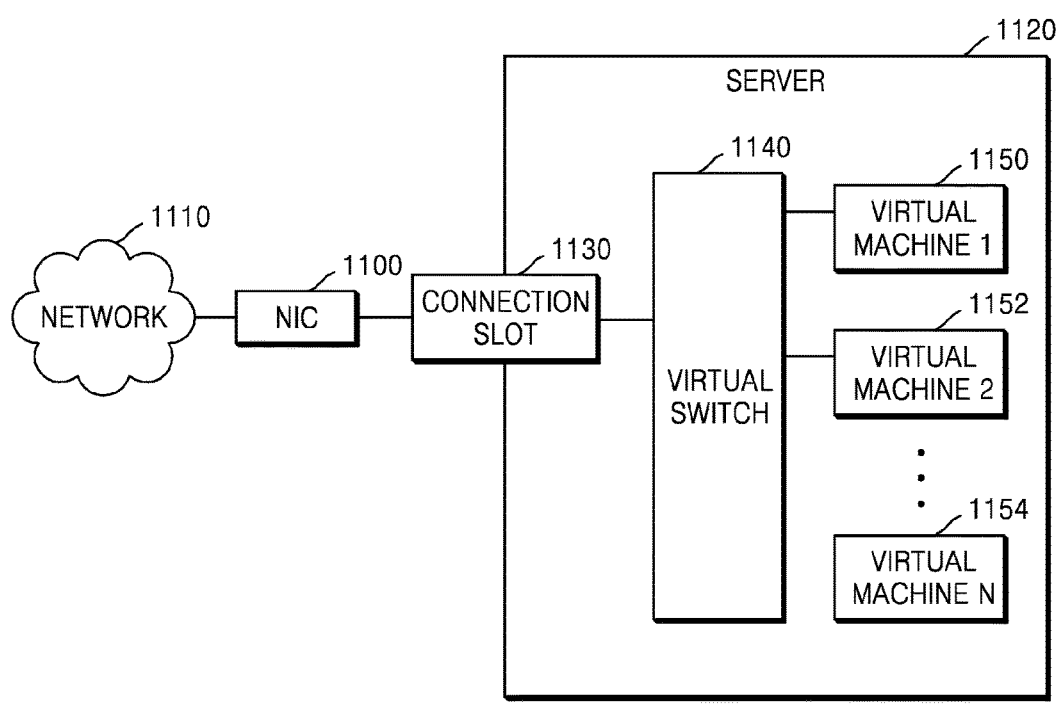
FIG. 11 is a view illustrating a schematic structure of a system including a network interface unit for multiprocessing according to an exemplary embodiment of the present invention.

FIG. 11 is a view illustrating a schematic structure of a system including a network interface unit for multiprocessing according to an exemplary embodiment of the present invention.

Referring to FIG. 11, the network interface unit is realized as a network interface card (NIC) 1100. However, the network interface unit is not necessary limited to the network interface card 1100 and may be realized as various types such as hardware, software, etc. inside and outside a server. For convenience of description, the network interface unit is expressed as an NIC.

A server 1120 includes a plurality of virtual machines 1150, 1152, and 1154, a virtual switch 1140, and a connection slot 1130. The virtual switch 1140 transmits a packet, which is received through an NIC 1100, to a destination virtual machine. The connection slot 1130 is an interface that connects the NIC 1100 and the server 1120, for example, may be realized as a Peripheral Component Interconnect Express (PCIe). In this case, the NIC 1100 may be attached into a PCIe slot.

The NIC 1100 analyzes a traffic characteristic of an upper layer of a packet received from a network 1110 to identify a flow and processes the identified flow in parallel through a multiprocessor. Here, the packet refers to a packet that encapsulates virtualization environment network layer information by using various types of tunneling so as to be transmitted to a plurality of virtual machines. A virtualization environment network layer refers to a layer of network formed of a virtual machine, and the virtualization environment network layer information refers to layer information of network which is formed of a virtual machine, and the virtualization environment network layer information is encapsulated in a physical network frame to transmit a packet through a layer of the network formed of the virtual machine. A packet that is identified based on virtualization environment network layer information used in the present exemplary embodiment will be referred to as a deep packet hereinafter. The deep packet is encapsulated in a physical network frame so as to be recognized and smoothly transmitted by a general communication protocol on a physical network. Also, a flow that is classified by using virtualization environment network layer information of a deep packet is referred to as a deep flow. The deep flow may be described as a flow generated by a virtual machine of a service terminal in a communication service structure.

The deep flow may be defined as a particular traffic on a virtualization environment network classified according to a traffic attribute of an upper layer (higher than or equal to virtual Layer 3 (vL3)) in a virtualization environment network frame which is obtained by decapsulating a physical network frame of a deep packet. The deep flow may be classified and identified according to preset several policies. For example, a packet analyzer 1310 may identify a TCP flow of a virtual machine as a deep flow. A structure of a deep packet will be described later with reference to FIG. 16.

The NIC 1100 includes a plurality of queues for processing a received deep packet in parallel and a plurality of processors. The sizes and the number of queues are fixed or dynamically changed according to information about a deep flow, virtualization environment information of a server, loads of processors, or the like.

Figure 12:
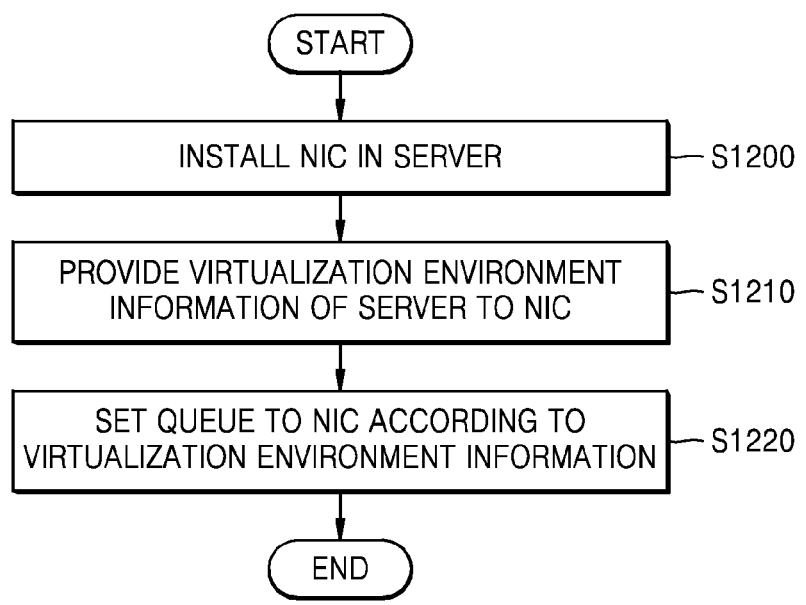
FIG. 12 is a view illustrating a method of dynamically setting resources an NIC according to an exemplary embodiment of the present invention.

FIG. 12 is a view illustrating a method of dynamically setting resources of an NIC according to an exemplary embodiment of the present invention.

Referring to FIGS. 11 and 12, if the NIC 1100 is attached into the connection slot 1130 of the server 1120 to be connected to the server 1120 in operation S1200, the NIC 1100 receives virtualization environment information including the number of virtual machines from the server 1120 in operation S1210. The NIC 1100 dynamically allocates resources, such as sizes and the number of queues, generations of queue groups, etc., according to information about a deep flow, received virtualization environment information, a load distribution of a processor, or the like in operation S1220.

For example, if the NIC 1100 receives virtualization environment information indicating that there are four virtual machines, from the server 1120, the NIC 1100 may allocate three of twelve queues to each of the four virtual machines. As another example, the NIC 1100 may divide deep flows into two groups and allocate six queues to each of the two groups based on information about the deep flows. The number of queues allocated to each virtual machine, a size of each queue, etc. may be variously determined according to a preset rule.

Figure 13:
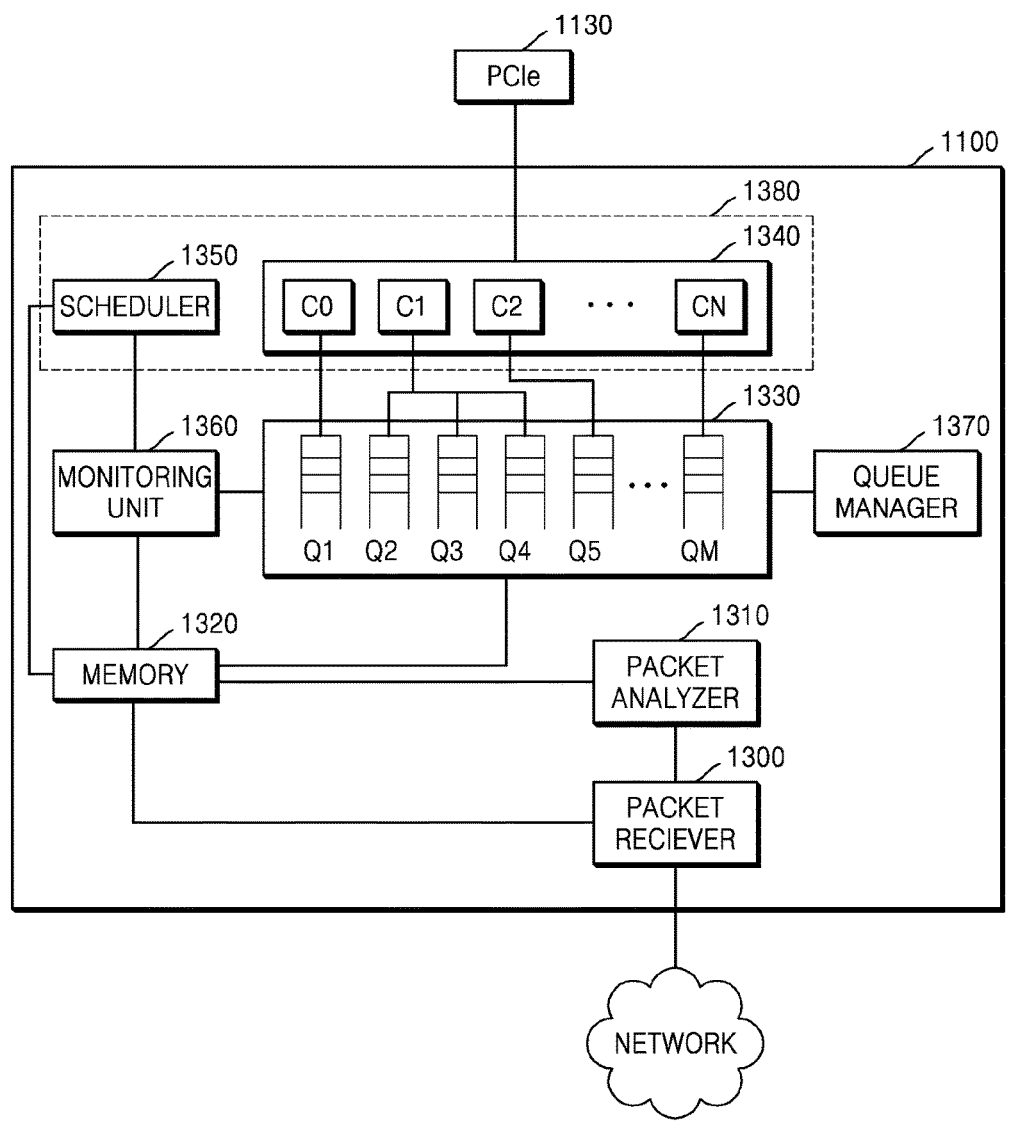
FIG. 13 is a view illustrating a structure of an NIC according to an exemplary embodiment of the present invention.

FIG. 13 is a view illustrating a structure of an NIC according to an exemplary embodiment of the present invention.

Referring to FIG. 13, the NIC 1100 includes a packet receiver 1300, the packet analyzer 1310, a memory 1320, a plurality of queues 1330, a plurality of processors 1340, a scheduler 1350, a monitoring unit 1360, and a queue manager 1370.

Connection lines between elements including the packet receiver 1300 are only an exemplary embodiment for helping understanding of the present invention. Various connection relations, such as a connection between the queue manager 1370 and the monitoring unit 1360, a connection between the scheduler 1350 and the plurality of queues 1330, etc., may be implemented.

If a packet that encapsulates a deep packet using a conventional various tunneling method to be recognized as a general Ethernet frame on an external network is received, the packet receiver 1300 decapsulates this to remove a header part corresponding to a physical network and restore a data packet frame for a virtualization environment.

The packet analyzer 1310 identifies a deep flow of the restored deep packet. In order to identify the deep flow, not only a data link layer (vL2 layer) but also an upper layer higher than or equal to a network layer (vL3 layer) in a virtualization environment may be analyzed. For this, the packet analyzer 1310 analyzes layers from the virtual data link layer (vL2 layer) to a virtual application layer (vL7 layer) of the decapsulated deep packet through a Deep Packet Inspection (DPI) process, and identifies a flow. The analysis of the deep packet for identifying the deep flow is not limited to an analysis of all layers from a virtual data link layer to a virtual application layer, and thus an analysis range may vary according to a deep flow identification policy.

The memory 1320 stores the deep packet and deep flow information identified by the packet analyzer 1310, and stores and manages a flow table indicating a mapping relation between the deep flow and a queue.

For example, the packet receiver 1300 stores the decapsulated deep packet in the memory 1320 and informs the packet analyzer 1310 of the storage of the deep packet. If then, the packet analyzer 1310 identifies the deep flow of the corresponding deep packet stored in the memory 1320. In other words, the packet analyzer 1310 that is informed of a reception of a new deep packet identifies a deep flow attribute of the corresponding deep packet according to a preset policy, stores information about the deep flow attribute, and informs the scheduler 1350 of the storage of the information.

The scheduler 1350 respectively allocates identified deep flows to corresponding queues and allocates the queues to the multiprocessor 1340 in parallel. In more detail, the scheduler 1350 searches for a queue, on which the deep flow of the deep packet is mapped, with reference to the flow table stored in the memory 1320 and transmits the deep packet stored in the memory 1320 to the searched queue. If mapping information about the deep flow of the received deep packet does not exist in the table, the scheduler 1350 allocates the deep flow to a particular queue through conventional various methods and stores a mapping relation between the deep flow and the queue in the flow table.

The scheduler 1350 may queue deep packets of respective virtual machines in the unit of deep flows. For example, when a mapping relation between a deep flow and a queue is set, first and second flows having the same attribute (e.g., the same QoS priority) heading for first and second virtual machines may be allocated to the same queue.

Figure 14:
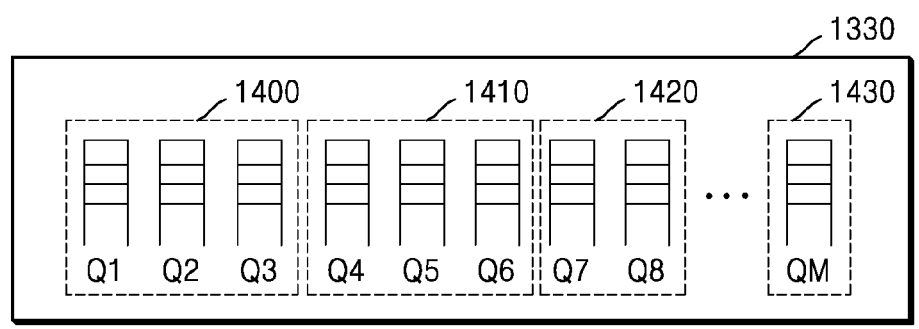
FIG. 14 is a view illustrating queue allocations based on a deep flow of an NIC according to an exemplary embodiment of the present invention.

The present invention does not exclude this case, but each deep flow of respective virtual machines may be allocated to queues of different groups in order to improve efficiency of parallel processing. In other words, if queues of each of virtual machines are grouped as shown in FIG. 14, the scheduler 1350 allocates a first flow of a first virtual machine to queues of a first group 1400 in the unit of deep flows and allocates a second flow of a second virtual machine to queues of a second group 1410 in the unit of deep flows.

For example, if information indicating that a new deep packet is loaded in the memory 1320 and deep flow information of the corresponding deep packet are received, the scheduler 1350 may search for which queue a deep flow is allocated to, with reference to a flow table and load the deep packet loaded in the memory 1320 into the corresponding queue. If information about an identified deep flow is not searched from the flow table, the scheduler 1350 may allocate the corresponding deep packet to one of queues belonging to a corresponding virtual machine according to a preset policy. Here, the preset policy may be various according to exemplary embodiments, e.g., there may be a policy for selecting a queue in consideration of a flow affinity, a policy for selecting a queue having a smallest load among queues in a virtual machine to which a deep packet will be transmitted, a policy for selecting a queue which is allocated to a processor having a lowest usage rate, etc.

Figure 15:
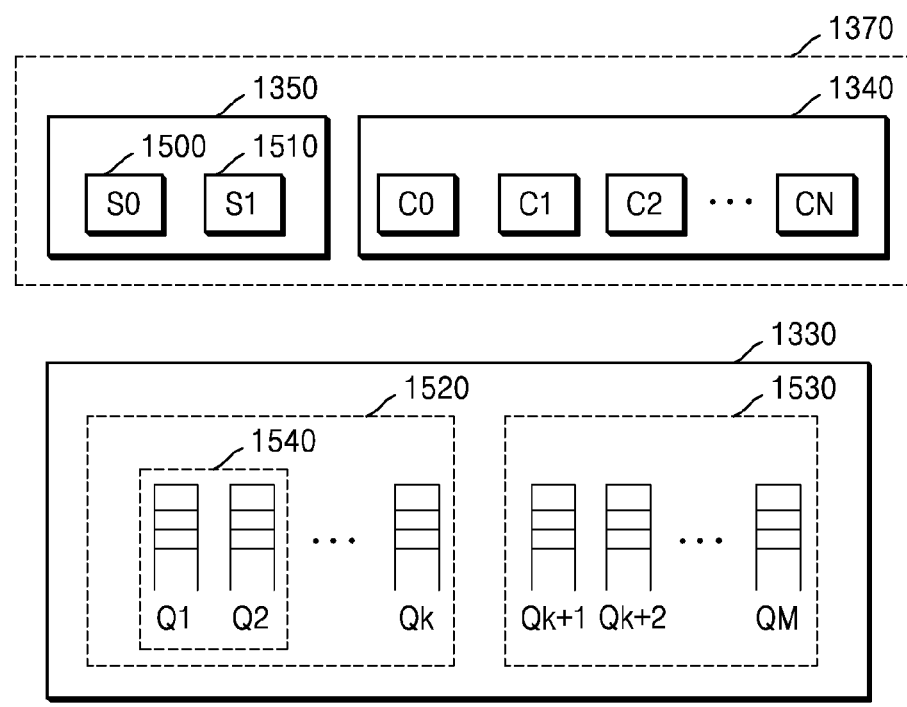
FIG. 15 is a view illustrating queue allocations based on a deep flow of an NIC according to another exemplary embodiment of the present invention.

The plurality of queues 1330 are respectively mapped on at least one or more deep flows. If queueing is performed in the unit of deep flows, a processor affinity is increased, and thus efficiency of parallel processing is increased. The plurality of queues 1330 may be divided into groups including at least one or more queues according to virtual machines. Also, the plurality of queues 1330 may be divided into at least one or more partitions as shown in FIG. 15. In addition, the plurality of queues 1330 may be divided into at least two or more partitions as shown in FIG. 15.

The scheduler 1350 may be a processor that is selected from a plurality of processors. For example, a particular processor 1350 of all of processors 1380 may be designated as a scheduler or a processor having a smallest load may be selected as the scheduler 1350 based on a load of the respective processors monitored by the monitoring unit 1360. Besides this, various methods of selecting a scheduler may be applied. As in the method described with reference to FIG. 8, if a scheduler is designated among processors, a controller (not shown) generates an interrupt signal whenever scheduling is needed and transmits the interrupt signal to a processor designated as a scheduler, and the processor that receives the interrupt signal stops a job the processor is performing, completes operations of the scheduler, and re-performs a previous job.

The plurality of processors 1340 process deep packets respectively stored in queues in parallel and transmit the processed deep packets to a virtual machine of a server. The single scheduling or multi-scheduling method described above with reference to FIGS. 1 through 10 may be applied to a plurality of processors. In other words, the plurality of processors may be grouped and scheduled in the unit of groups. The plurality of processors 1340 are connected to at least one or more queues.

For examples, the plurality of processors 1340 are connected to a queue in consideration of a flow affinity. In other words, queues that store deep packets having the same or similar deep flow attributes are grouped and then connected to a processor.

As another example, the plurality of processors 1340 may be connected to queues according to virtual machines. Referring to FIG. 14, a first processor may be connected to first through third queues 1400 allocated to a first virtual machine, a second processor may be connected to fourth through sixth queues 1410 allocated to a second virtual machine, and a third processor may be connected to seventh and eighth queues 1420 allocated to a third virtual machine.

As another example, a first processor may be connected to first through third queues allocated to a first virtual machine and a fourth queue allocated to a second virtual machine. In this case, a second processor may be connected to fifth and sixth queues allocated to a second virtual machine. In other words, a processor may be connected to all or some of queues allocated to at least two or more virtual machines.

The monitoring unit 1360 monitors various states including loads of the processor 1340 and the queue 1330, etc.

The queue manager 1370 divides queues into a plurality of partitions according to the monitoring result as shown in FIG. 15 and designates a scheduler for each of the partitions, combines a plurality of queues into one group or divides the plurality of queues, or increases or decreases the number of queues allocated to a virtual machine to adjust sizes, the number, etc. of the queues. The queue manager may dynamically set the number, sizes, etc. of queues of each of virtual machines according to a virtualization environment, etc. of a server checked through the above-described process of FIG. 12.

FIG. 14 is a view illustrating queue allocations based on a deep flow of an NIC according to an exemplary embodiment of the present invention.

Referring to FIG. 14, the queues 1330 are divided according to virtual machines. For example, first through third queues 1400 are allocated to a first virtual machine, fourth through sixth queues 1410 are allocated to a second virtual machine, and seventh and eighth queues 1420 are allocated to a third virtual machine. A scheduler performs queuing with reference to deep flows of each virtual machines.

For example, if deep flows heading for the first virtual machine are identified according to priorities, the scheduler 1350 classifies and stores deep packets in the first through third queues 1400 allocated to the first virtual machine based on the priorities. In other words, a deep flow having the highest priority among the deep flows heading for the first virtual machine is stored in the first queue, a deep flow having a next priority is stored in the second queue, and deep flows having the other priorities are stored in the third queue.

FIG. 15 is a view illustrating queue allocations based on a deep flow of an NIC according to another exemplary embodiment of the present invention.

Referring to FIG. 15, the queues 1330 are divided into at least two or more partitions 1520 and 1530. Schedulers 1500 and 1510 are respectively allocated to the partitions 1520 and 1530. For example, the first scheduler 1500 is allocated to the first partition 1520, and the second scheduler 1510 is allocated to the second partition 1530. The schedulers 1500 and 1510 independently perform scheduling operations with respect to allocated partitions. The present exemplary illustrates grouping of the queues 1330 into two groups 1520 and 1530. According to exemplary embodiments, the queues 1330 may be grouped into three or more groups, and the multi-scheduling method described with reference to FIGS. 1 through 10 may be applied to scheduling of each of the three or more groups. A scheduler may be a processor that is selected from a plurality of processors 1380 by a preset method as described above.

For example, if a load distribution of a queue measured by a monitoring unit falls to be lower than or equal to a preset threshold value during scheduling through one scheduler as shown in FIG. 13, re-balancing of queues or re-allocating of processors may be determined. Alternatively, the statistical number of deep packets received from a network or processor abilities performed by a total of processors in an NIC may be calculated to determine re-balancing of queues or re-allocating of processors if a load of a processor is lower than or equal to a threshold value. If queues are divided into a plurality of partitions as shown in FIG. 15, an additional designation of a scheduler is needed when performing re-balancing of queues or re-allocating of processors, a processor having a smallest load may be designated as an additional scheduler.

Queues belonging to each partition may be divided into groups 1540 based on a virtual machine, and queues in the groups may be classified based on a deep flow. In this case, a hierarchical structure, i.e. partitions—groups for each virtual machine—queues in each group, is generated.

Figure 16:
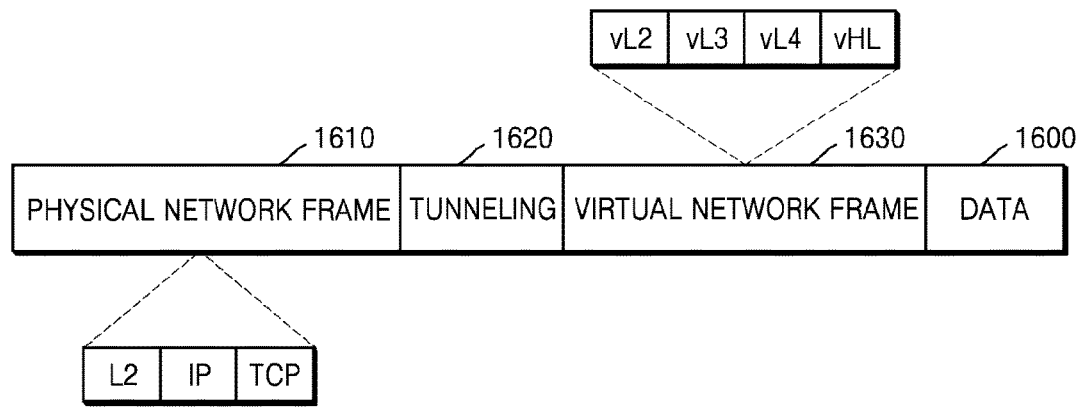
FIG. 16 is a view illustrating a used deep packet according to an exemplary embodiment of the present invention.

FIG. 16 is a view illustrating a deep packet according to an exemplary embodiment of the present invention.

Referring to FIG. 16, the deep packet includes a physical network frame 1610, a tunneling field 1620, an inter-virtual machine network frame 1630, and a data field 1600.

The physical network frame 1610 includes information indicating layers of an existing physical network such as L2, IP, TCP, etc. The tunneling field 1620 indicates tunneling information or the like. The inter-virtual machine network frame 1630 includes information about layers (vL2 through vL7) in an inter-virtual machine network environment. The data field 1600 includes data.

A structure of the deep packet of FIG. 16 is an exemplary embodiment for assisting understanding of the present invention and thus is not limited thereto. Therefore, a various types of a deep packet structure for a virtual machine environment may be defined and used.

Also, a structure of a deep packet stored in a memory and a structure of a deep packet stored in a queue may be the same as or different from each other according to exemplary embodiments. For example, the packet of FIG. 16 received from a network may be decapsulated to restore a deep packet and changes the deep packet into an optimal structure that may be processed in a virtual machine environment or some or all of fields unnecessary in a virtual machine environment may be deleted from fields of the deep packet. In other words, a design may be variously changed and then stored in a queue.

Figure 17:
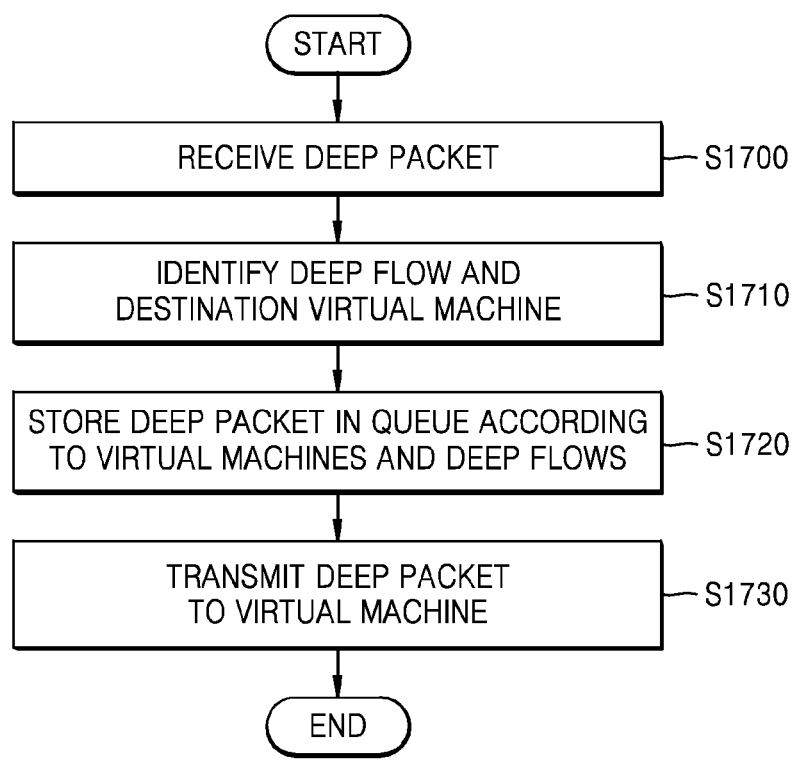
FIG. 17 is a flowchart of a method of processing a packet for a virtual machine environment according to an exemplary embodiment of the present invention.

FIG. 17 is a flowchart illustrating a method of processing a packet for a virtual machine environment according to an exemplary embodiment of the present invention.

Referring to FIG. 17, if a network interface unit receives a deep packet in operation S1700, the network interface unit analyzes the deep packet through a DPI process or the like to identify a destination virtual machine, to which the deep packet will be transmitted, and a deep flow in operation S1710. In operation S1720, the network interface unit stores a deep packet in the unit of deep flow in one or more queues allocated to each virtual machine. The network interface unit also processes the deep packet stored in each queue through a plurality of processors and transmits the processed deep packet to a virtual machine in operation S1730.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A scheduling method between a virtualized network and a physical network comprising:
    receiving a physical network frame including physical network layer information from the physical network, wherein the physical network frame encapsulates a deep packet comprising virtualization environment network layer information, wherein the virtualization environment network layer is the layer of network formed of virtual machines included in the virtualized network;
    identifying a destination virtual machine and a deep flow of the deep packet based on information of the virtualization environment network layer higher than or equal to L3 comprised in the deep packet;
    allocating the deep packet to a queue of a queue group allocated to the destination virtual machine based on the identified deep flow, wherein the queue group includes one or more queues allocated to the destination virtual machine; and
    transmitting the deep packet of the queue to the virtualized network.

2. The scheduling method of claim 1, further comprising:
    grouping one or more queues according to virtual machines.

3. The scheduling method of claim 1, wherein:
the allocating of the deep flow comprises allocating the deep packet to a corresponding queue based on the destination virtual machine and the deep flow.

4. The scheduling method of claim 1, wherein the virtualization environment network layer information is encapsulated into a physical network frame to transmit packet through a layer of network formed of a virtual machine, and the deep packet is encapsulated in the physical network frame so as to be recognized and transmitted by a general communication protocol on a physical network.

5. The scheduling method of claim 1, wherein the allocating of the deep packet comprises:
selecting a queue group from a plurality of queue groups comprising at least one or more queues based on a destination virtual machine; and
selecting a queue to store a packet in the selected queue group, based on the deep flow.

6. The scheduling method of claim 1, wherein the number of queues allocated to each virtual machine is dynamically determined based on virtualization environment information comprising information about a virtual machine or a load distribution.

7. The scheduling method of claim 1, wherein a plurality of queue groups including at least one or more queues are allocated to each virtual machine, and a scheduler allocates one of the plurality of queue groups to the deep packet based on a destination virtual machine of the deep packet and allocates a queue in a selected queue group based on the deep flow.

8. A network interface unit between a virtualized network and a physical network, comprising:
one or more processors;
a packet receiver executing on the one or more processors configured to receive a physical network frame including physical network layer information from the physical network, wherein the physical network frame encapsulates the deep packet comprising virtualization environment network layer information through a physical network, wherein the virtualization environment network layer is the layer of network formed of virtual machines included in the virtualized network;
a packet analyzer executing on the one or more processors configured to identify a destination virtual machine and a deep flow of the deep packet based on the information of the virtualization environment network layer higher than or equal to L3 comprised in the deep packet; and
a scheduler executing on the one or more processors configured to allocate the deep packet to a queue of a queue group allocated to the destination virtual machine based on the identified deep flow, wherein the queue group includes one or more queues allocated to the destination virtual machine and
wherein the deep packet of the queue is transmitted to the virtualized network.

9. The network interface unit of claim 8, wherein the scheduler executing the on one or more processors selects a queue group from a plurality of queue groups comprising at least one or more queues based on a destination virtual machine and selects a queue to store a packet in the selected queue group, based on the deep flow.

* * * * *